US009241279B2

(12) United States Patent
Ando et al.

(10) Patent No.: US 9,241,279 B2
(45) Date of Patent: Jan. 19, 2016

(54) COMMUNICATION CONTROL APPARATUS, COMMUNICATION CONTROL SYSTEM AND COMMUNICATION CONTROL METHOD

(71) Applicant: FUJITSU LIMITED, Kawasaki-shi, Kanagawa (JP)

(72) Inventors: Kazuaki Ando, Shibuya (JP); Dai Kimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 199 days.

(21) Appl. No.: 13/925,261

(22) Filed: Jun. 24, 2013

(65) Prior Publication Data

US 2014/0004888 A1 Jan. 2, 2014

(30) Foreign Application Priority Data

Jul. 2, 2012 (JP) ................. 2012-148937

(51) Int. Cl.

| H04W 28/02 | (2009.01) |
| H04W 24/08 | (2009.01) |
| H04W 72/08 | (2009.01) |
| H04L 1/00 | (2006.01) |
| H04W 24/02 | (2009.01) |
| H04W 52/02 | (2009.01) |
| H04W 28/06 | (2009.01) |

(52) U.S. Cl.
CPC ............. *H04W 24/08* (2013.01); *H04L 1/00* (2013.01); *H04W 24/02* (2013.01); *H04W 28/0226* (2013.01); *H04W 52/0245* (2013.01); *H04W 72/08* (2013.01); *H04W 28/06* (2013.01); *Y02B 60/50* (2013.01)

(58) Field of Classification Search
CPC ..... H04W 4/001; H04W 4/003; H04W 4/021; H04W 4/022–4/028; H04W 8/00; H04W 8/08; H04W 8/22; H04W 8/24; H04W 28/00; H04W 28/02; H04W 28/0226; H04W 28/0231; H04W 28/0236; H04W 28/0242; H04W 28/0247; H04W 28/0252; H04W 28/0257; H04W 28/0263; H04W 28/0268; H04W 28/0284; H04W 40/12; H04W 40/14; H04W 40/20

USPC .............. 455/436, 439–441, 445.2, 457, 453, 455/456.1–456.6, 134, 135, 150.1, 434, 455/450, 451, 452.1, 452.2

See application file for complete search history.

(56) References Cited

U.S. PATENT DOCUMENTS

| 6,882,845 | B2 * | 4/2005 | Sato et al. ...................... 455/446 |
| 2001/0034239 | A1 * | 10/2001 | Yamato et al. ................. 455/456 |
| 2006/0092942 | A1 * | 5/2006 | Newson .................. H04L 29/06 370/392 |
| 2007/0259671 | A1 * | 11/2007 | Cheng et al. ................ 455/452.2 |
| 2008/0171553 | A1 * | 7/2008 | Ren ........................ H04W 72/02 455/450 |
| 2010/0286907 | A1 * | 11/2010 | Hilbrandie et al. ............ 701/201 |
| 2011/0077855 | A1 * | 3/2011 | Sumizawa ..................... 701/201 |
| 2012/0076040 | A1 * | 3/2012 | Hoshino et al. ................ 370/252 |
| 2012/0282943 | A1 * | 11/2012 | Hsiao .................. H04W 72/082 455/452.2 |
| 2012/0282979 | A1 * | 11/2012 | Ashraf et al. ................. 455/561 |

FOREIGN PATENT DOCUMENTS

| JP | 2003-152630 A | 5/2003 |
| JP | 2008-236381 A | 10/2008 |
| JP | 2009-188883 A | 8/2009 |

\* cited by examiner

*Primary Examiner* — Christopher M Brandt
*Assistant Examiner* — Ki Ha Nam
(74) *Attorney, Agent, or Firm* — Arent Fox LLP

(57) ABSTRACT

A communication control apparatus that controls a wireless communication between a base station and a terminal, the communication control apparatus including: a memory configured to store combinations of each of threshold values, each of areas, and each of realtimenesses, and a processor configured to obtain a specified threshold value of the threshold values by referring the combinations in accordance with a specified area and a specified realtimeness, the specified area being one of the areas where the terminal is located, the specified realtimeness being one of the realtimenesses and being information which indicates how long a delay time from requesting a data communication to performing the data communication is acceptable, and to permit the terminal the data communication, when a channel quality between the terminal and the base station is better than the specified threshold value.

15 Claims, 12 Drawing Sheets

| LATITUDE | LONGITUDE | SINR [dB] |
|---|---|---|
| 35.xxxxx1 | 139.yyyyy1 | aa |
| 35.xxxxx2 | 139.yyyyy2 | bb |
| 35.xxxxx3 | 139.yyyyy3 | cc |
| 35.xxxxx4 | 139.yyyyy4 | ee |
| 35.xxxxx5 | 139.yyyyy5 | dd |
| 35.xxxxx6 | 139.yyyyy6 | ee |
| 35.xxxxx7 | 139.yyyyy7 | gg |
| 35.xxxxx8 | 139.yyyyy8 | yy |
| 35.xxxxx9 | 139.yyyyy9 | kk |

212a

CHANNEL QUALITY (AREA C)

| CUMULATIVE PROBABILITY VALUE [%] | SINR THRESHOLD VALUE [dB] |
|---|---|
| 0 | aaa |
| 10 | bbb |
| 20 | ccc |
| ⋯ | ⋯ |
| 70 | ddd |
| 80 | eee |
| 90 | fff |
| 100 | ggg |

212b

THRESHOLD VALUE (AREA C)

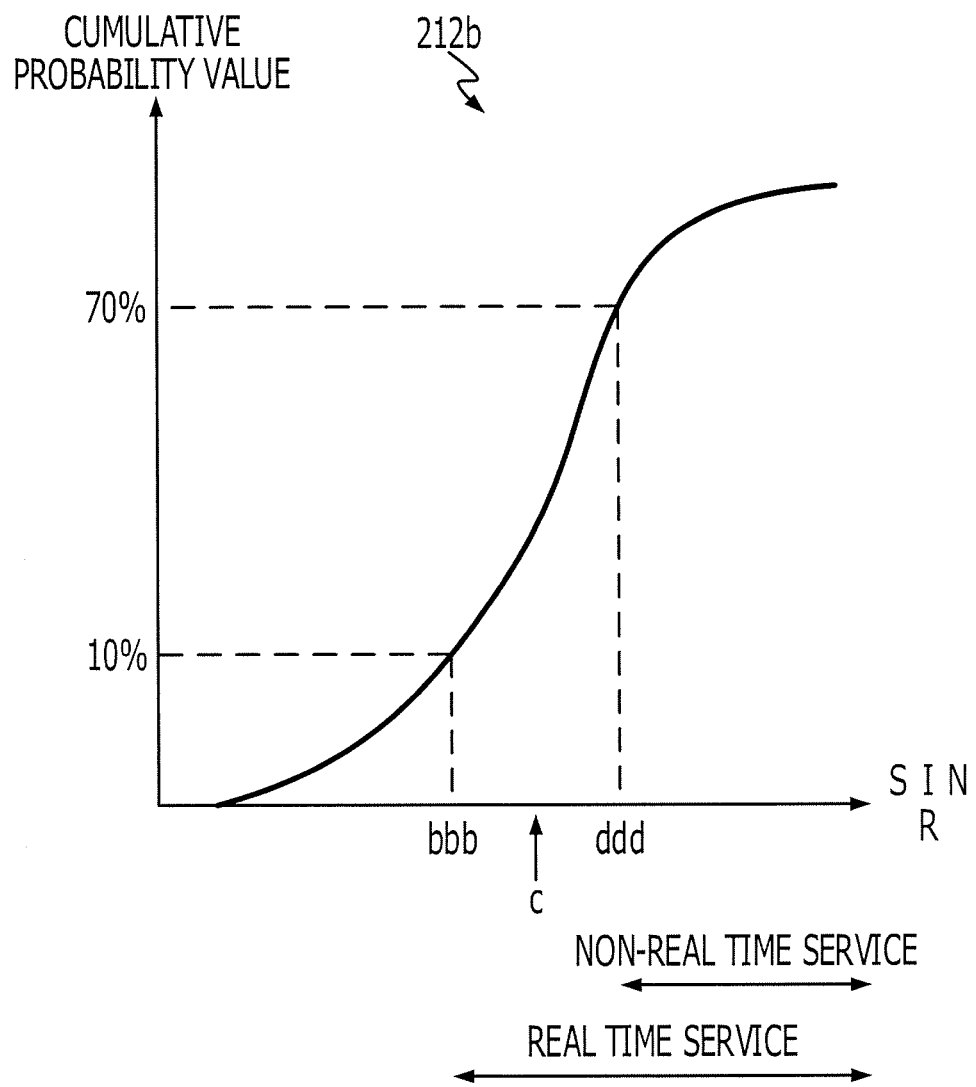

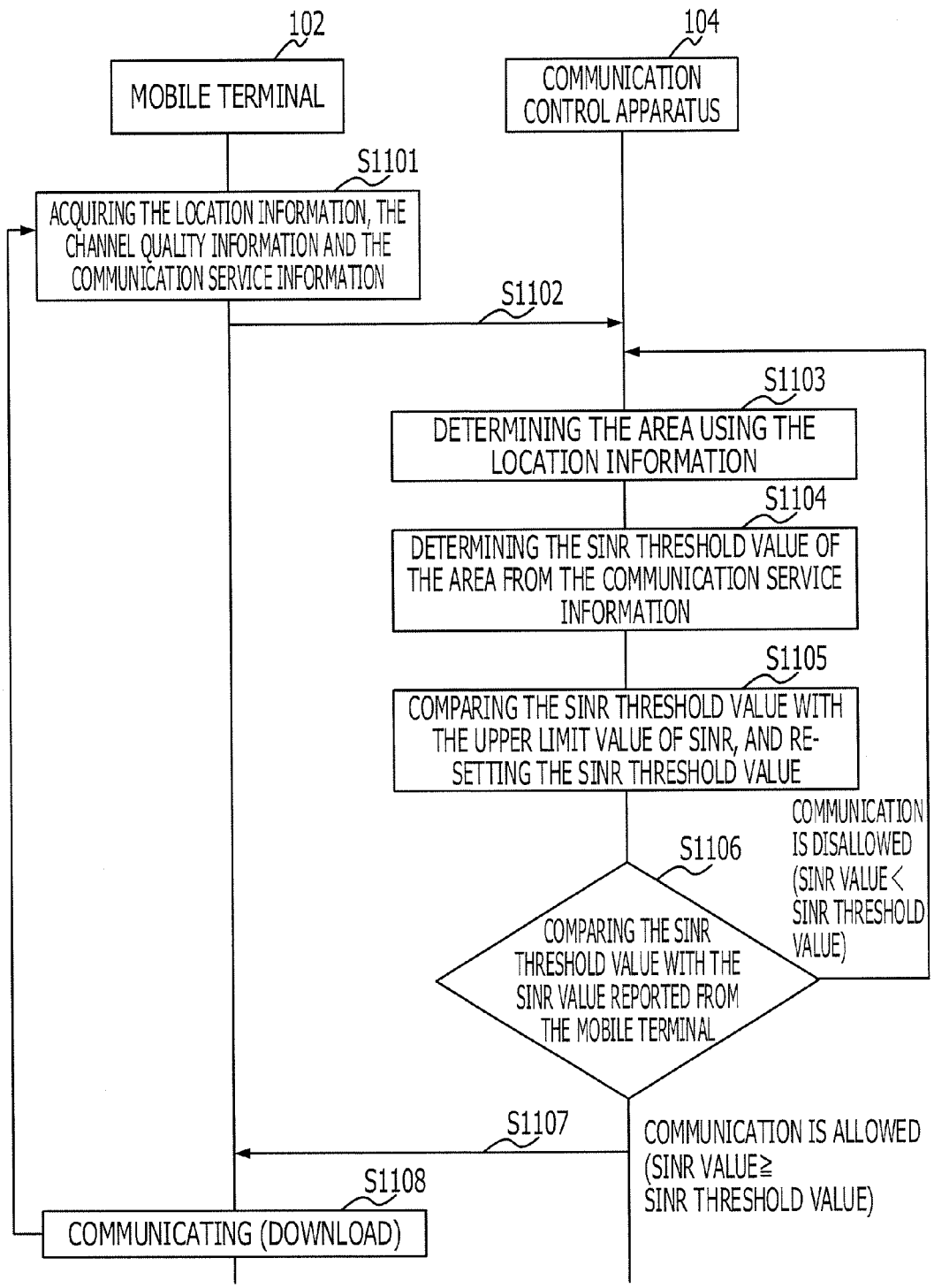

IN A CASE WHERE THE DOWNLOAD SIZE BECOMES SMALLER

NORMAL

COMMUNICATION CONTROL APPARATUS, COMMUNICATION CONTROL SYSTEM AND COMMUNICATION CONTROL METHOD

CROSS-REFERENCE TO RELATED APPLICATION

This application is based upon and claims the benefit of priority from the prior Japanese Patent Application No. 2012-148937 filed on Jul. 2, 2012, the entire contents of which are incorporated herein by reference.

FIELD

The present invention relates to a communication control apparatus, a communication control system and a communication control method that control communication with respect to a mobile terminal located within a communication area.

BACKGROUND

Recently, the traffic of the mobile communication system is increasing continuously in line with the distribution of a multifunctional mobile terminal called a smart phone. As a countermeasure for such an increase in traffic, a policy measure is being proposed in which the communication channel capacity between a base station and a mobile terminal is increased to increase the communication capability of the entire mobile communication system. As such, even if a service provider increases the communication capacity, the location of a mobile terminal of a user frequently changes, and thus, the number of mobile terminals located at a certain area frequently varies. As a result, an imbalance in the number of mobile terminals (frequency utilization efficiency in communication) occurs. In an effort to resolve problems related to such variation in the number of mobile terminals in each area, there is a technology in which data communication (download transmission) from a base station for a mobile terminal is controlled.

For example, there is a technology in which a movement path of a mobile terminal is estimated and variation in wireless resources in each area is predicted along the estimated movement path in order to perform a communication control in accordance with the wireless resources conditions. See, for example, Japanese Laid-Open Patent Publication No. 2009-188883. For example, in an area where a wireless resource is congested, communication may not be allowed for the mobile terminal until the mobile terminal moves to a next area where the mobile terminal would not experience the wireless resource congestion, so that it is possible to efficiently utilize the wireless resources.

As another example, there is a technology in which a base station receives a report from a mobile terminal regarding the channel quality of a downlink communication directed from the base station to the mobile terminal, and the base station acquires a temporal distribution of the channel quality to equally allot channels for transmission with respect to a plurality of mobile terminals. See, for example, Japanese Laid-Open Patent Publication No. 2003-152630. In addition, there is a technology in which a mobile terminal investigates a path appropriate for a destination information and an intended communication condition (e.g., a real time nature, or a bit rate), and performs a communication when the location of the mobile terminal which has moved is in conformity with the communication condition. As a result, the channel quality and communication efficiency may be improved. See, for example, Japanese Laid-Open Patent Publication No. 2008-236381.

SUMMARY

According to an aspect of the invention, a communication control apparatus that controls a wireless communication between a base station and a terminal, the communication control apparatus including: a memory configured to store combinations of each of threshold values, each of areas, and each of realtimenesses, and a processor configured to obtain a specified threshold value of the threshold values by referring the combinations in accordance with a specified area and a specified realtimeness, the specified area being one of the areas where the terminal is located, the specified realtimeness being one of the realtimenesses and being information which indicates how long a delay time from requesting a data communication to performing the data communication is acceptable, and to permit the terminal the data communication, when a channel quality between the terminal and the base station is better than the specified threshold value.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 4A and 4B are views illustrating information stored in a channel quality database.

FIG. 5 is a graph illustrating a SINR threshold value calculated by a cumulative probability distribution.

FIG. 11 is a sequence diagram illustrating the processing contents of a communication control processing performed by the communication control apparatus according to the third embodiment.

DESCRIPTION OF EMBODIMENTS

Even if the communication from a base station to a mobile terminal is controlled by predicting a channel quality, the channel quality varies for each timing and location of the mobile terminal within a specific area of a predetermined range. The channel quality such as a SINR (Signal-to-Interference-plus-Noise Ratio) value or throughput varies with being affected by an increase or decrease of the number of mobile terminals within the area, the reflection of radio wave by a mountain or a building, or an interference such as a noise. Therefore, it is difficult to accurately predict the channel quality in a predetermined area, and the communication efficiency has not been improved in a conventional communication control (download control).

For example, when it is assumed that a communication is not performed until a mobile terminal reaches an area where wireless resources are not congested, a plurality of mobile terminals that arrived the area perform communications concurrently and thus, a new problem arises in that the wireless resources in the area are consumed quickly and the communications by other mobile terminals cannot be performed. Also, in the conventional technology, when each mobile terminal is under a different communication condition, it may be difficult to perform communications satisfying the communication condition of each mobile terminal and to utilize the wireless resources efficiently.

According to one aspect, the present disclosure intends to perform a communication control corresponding to the channel quality of a mobile terminal thereby enhancing the communication efficiency.

First Embodiment

Overall Configuration of the System

Figure 1:
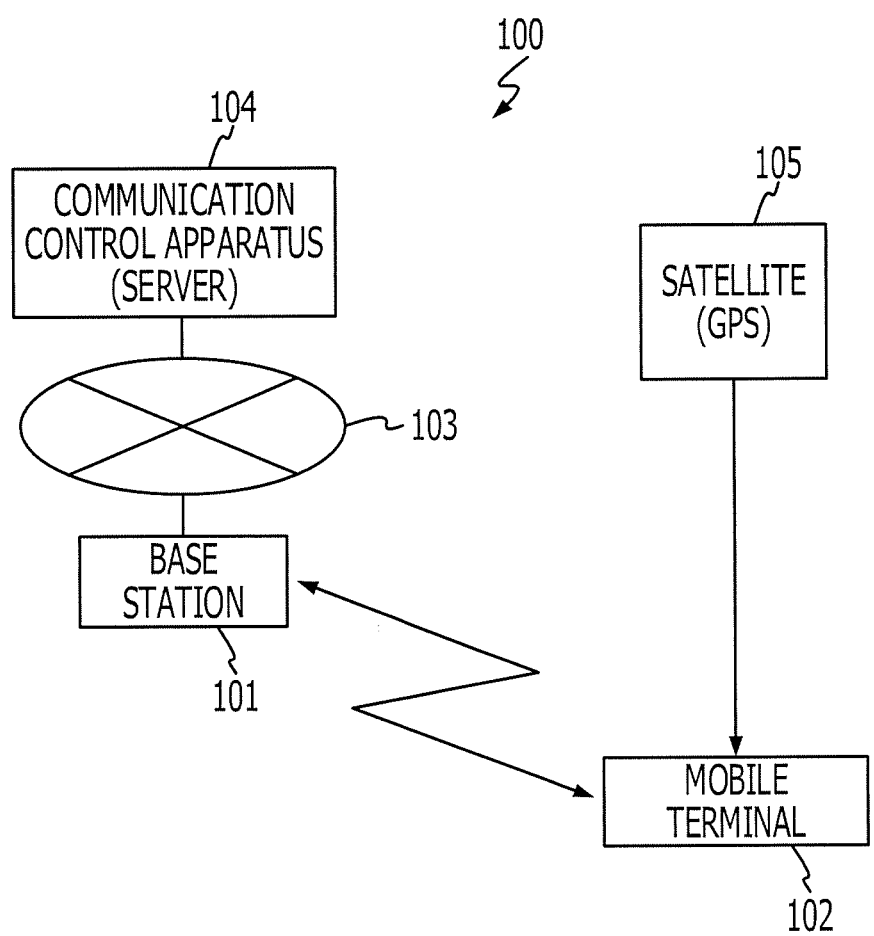
FIG. 1 is a block diagram illustrating an exemplary configuration of a communication control system according to a first embodiment.

Hereinafter, an embodiment appropriate for the disclosed technology will be described with reference to the accompanying drawings. FIG. 1 is a block diagram illustrating an exemplary configuration of a communication control system according to a first embodiment. The communication control system 100 may be applied to a mobile communication in which a mobile station (mobile terminal) 102 performs a communication with a base station 101 using radio waves.

The base station 101 includes a wireless communication unit that performs a wireless communication with the mobile terminal 102 using wireless channel (wireless resources) by radio waves, and a network communication unit that performs a communication with a communication control apparatus 104 via a network 103. Further, the control unit (not illustrated) controls a data transmission (download) from the base station 101 to the mobile terminal 102 based on a communication control performed by the communication control apparatus 104.

When communicating with the base station 101, the mobile terminal 102 reports to the base station 101 with various information including location information, channel quality information and communication service information. The base station 101 transmits (transfers) these information reported from the mobile terminal 102 to the communication control apparatus 104. The mobile terminal 102 may be equipped with functions that generate the location information, the channel quality information and the communication service information.

The mobile terminal 102 of the present embodiment includes, for example, a location information detection unit that receives radio waves from a GPS 105 and detects location information of the mobile terminal 102, and a channel quality measurement unit that measures the channel quality when communicating with the base station 101. The channel quality parameters to be utilized may include, but not limited to, a signal to interference plus noise ratio (SINR) value received by the mobile terminal, a throughput (communication speed), a reception strength, and a bit error rate. The SINR value will be used as the channel quality parameter in the following description. These channel quality parameters may be readily detected in the mobile terminal 102.

The communication service information is largely divided into two types of information depending on the real time nature (a realtimeness) of data transmission and includes information regarding whether the service requested by the mobile terminal 102 needs to be provided instantly or not by the base station 101. The realtimeness corresponds to a period of time counted from the time when a user starts to manipulate to the time when the download of data is actually started. For example, a web browsing or moving picture streaming reproduction falls within a real time service which requires an instant data transmission. In the meantime, a non-real time service includes, for example, downloading of an updated application file, or downloading of a document or periodical subscription information that do not need an instant data transmission.

In the mobile terminal 102, data to be handled and data to be downloaded from the base station 101 are determined for each application being activated. Therefore, the mobile terminal 102 can detect a communication service type (the real time nature of data transmission requested to the base station 101) based on the data type requested for a download transmission or an application type being activated. Also, the mobile terminal 102 reports the communication service information to the communication control apparatus 104 via the base station 101.

For example, a server may be utilized for the communication control apparatus 104. In the present embodiment, the communication control for the mobile terminal is not limited to the utilization of a specific single communication control apparatus (server) 104, but may include the utilization of a cloud computing. The communication control apparatus 104 performs the communication control for the plurality of base stations 101 (and mobile terminals 102) via the network 103. Further, the functions of the communication control apparatus 104 may be provided in the base station 101.

Exemplary Configuration of Communication Control Apparatus

Figure 2:
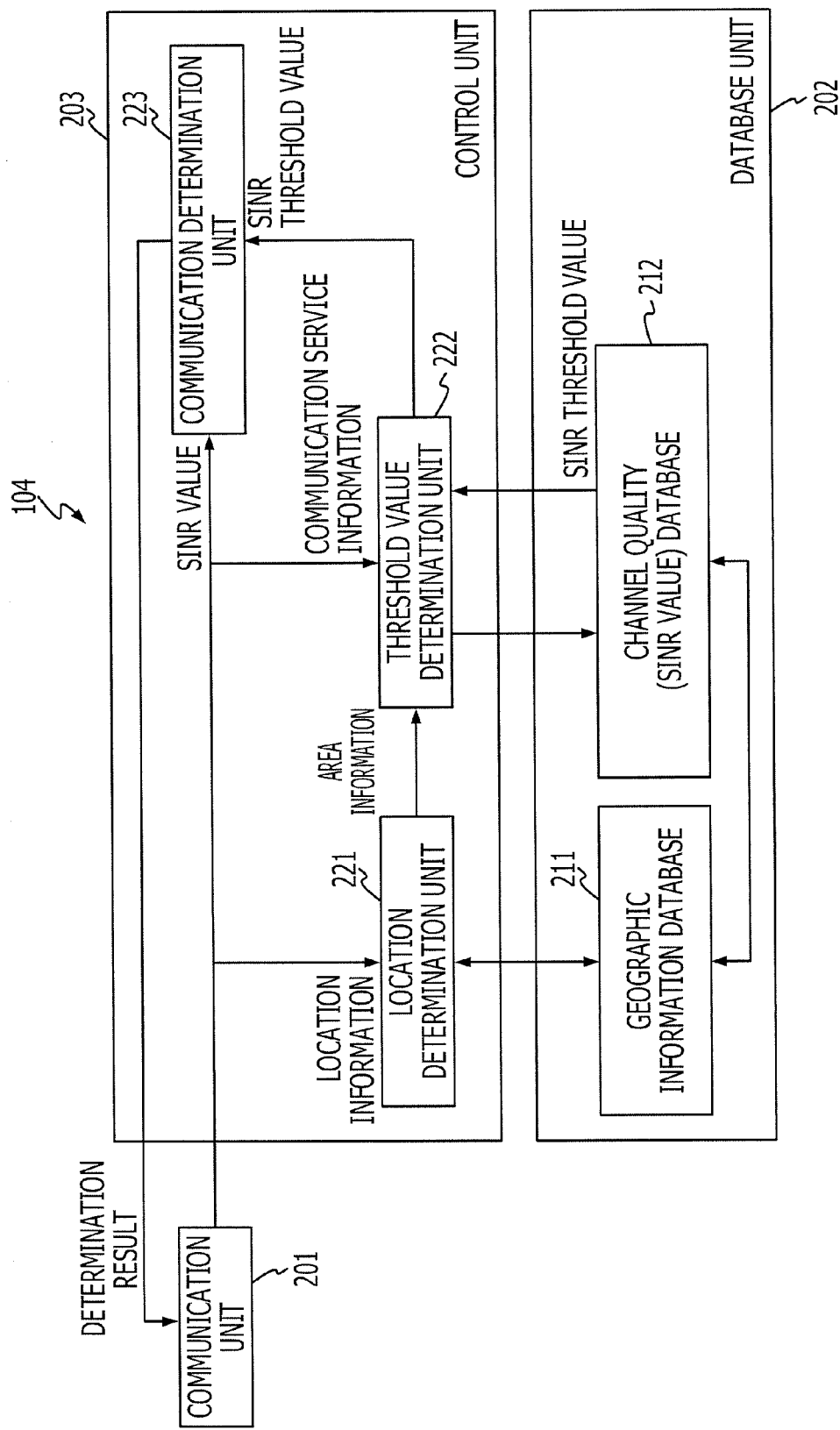
FIG. 2 is a block diagram illustrating an example of the functions of a communication control apparatus.

FIG. 2 is a block diagram illustrating an example of the functions of a communication control apparatus. The communication control apparatus (server) 104 includes a communication unit 201, a database unit 202, and a control unit 203. The communication unit 201 performs a transmission/reception of data to/from the mobile terminal 102 via the base station 101. The database unit 202 includes a geographic information database 211 and a channel quality database 212. The setting unit (not illustrated) stores these information in the database unit 202.

The geographic information database 211 stores information (e.g., a latitude and a longitude) of each of a plurality of partitioned areas formed by dividing the geographic information. The channel quality database 212 stores the channel quality of radio waves (SINR value) and a SINR threshold value for each partitioned area. The setting unit stores the area information divided from outside of the communication control apparatus 104 in the geographic information database 211 of the database unit 202. Further, the setting unit may perform a processing that divides the geographic information into multiple areas.

The control unit 203 includes a location determination unit 221, a threshold value determination unit 222, and a communication determination unit 223. The location determination unit 221 refers to the geographic information database 211 using the location information of the mobile terminal 102 received by the communication unit 201 from the mobile terminal 102, and determines where the mobile terminal 102 is located on a map.

The threshold value determination unit 222 reads and determines the SINR threshold value of the area where the mobile terminal 102 is determined to be located by the location determination unit 221, from the database unit 202 (channel quality database 212). The communication determination unit 223 compares the SINR threshold value determined by the threshold value determination unit 222 with the SINR value reported from the mobile terminal 102, and according to the comparison result, determines whether the starting of download from the base station 101 is permitted for the mobile terminal 102.

In the following description, when the SINR value equals to or more than the SINR threshold value, it is assumed that the download from the base station 101 is started to the mobile terminal 102. The determination result regarding whether the communication is allowed or disallowed is transmitted to the base station 101 via the communication unit 201, and the base station 101 controls the starting of the communication (download) to the mobile terminal 102 in response to the determination result.

Figure 3:
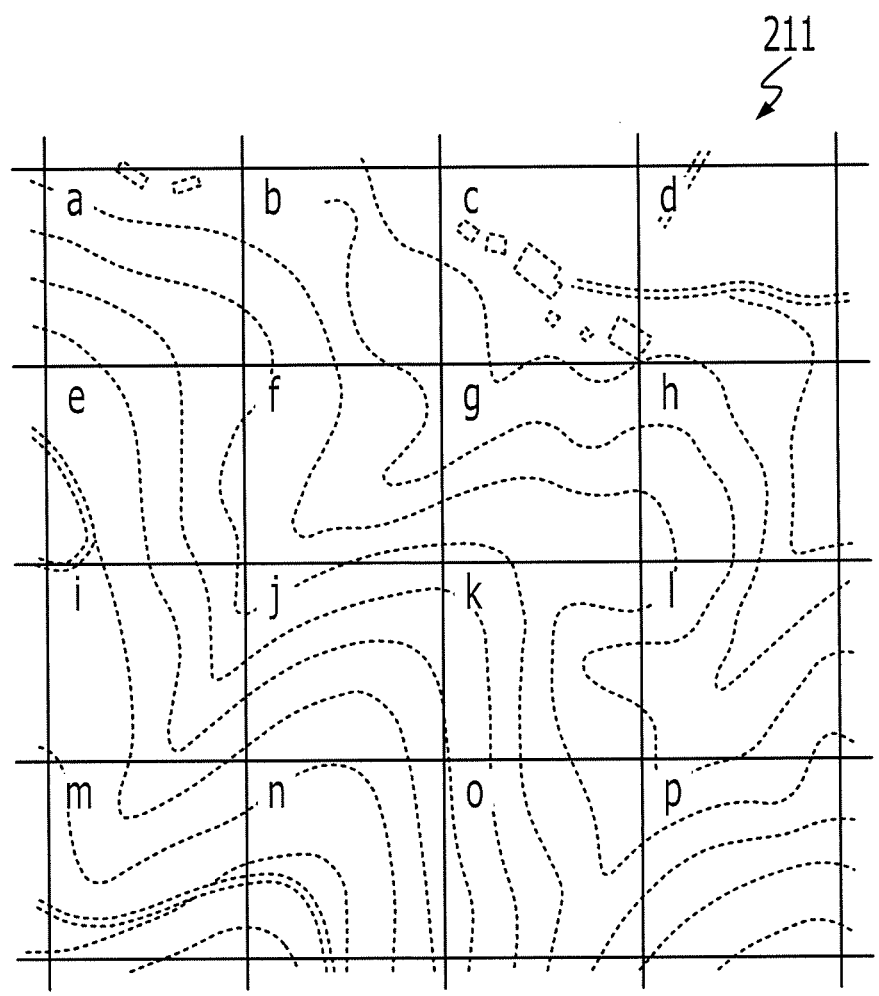
FIG. 3 is a view illustrating information stored in a geographic information database.

FIG. 3 is a view illustrating the information stored in a geographic information database. In FIG. 3, although a planar image of a map is represented for the convenience of explanation, the information stored in the geographic information database 211 is not limited to an image, and the geographic information database 211 may also store numerical values representing data for a latitude and longitude and data for a structure. In an example represented in FIG. 3, the geographic information is partitioned into a plurality of areas a to p by being equally divided into vertically and horizontally. Further, the latitude and longitude ranges for each of the areas a to p are stored as information. Further, the dotted lines in the map represent a topography (altitude line).

FIG. 4 is a view representing information stored in the channel quality database. In FIG. 4, information about the area c of FIG. 3 is represented. A channel quality information 212*a* represented in FIG. 4A and a threshold value information 212*b* represented in FIG. 4B are stored in the channel quality database 212. The channel quality information 212*a* represented in FIG. 4A includes latitudes and longitudes of a plurality of locations in a predetermined range of the area c illustrated in FIG. 3 and the SINR values of each location. When viewed from FIG. 3, the SINR values of each location are distributed in a plurality of locations within the area c. The results of SINR values measured in an area in advance are stored in the channel quality information 212*a*. For example, all of the SINR values for each location (latitude and longitude) reported from the mobile terminal 102 may be maintained, and a cumulative probability distribution of the SINR value may be acquired.

Additionally, the corresponding location of the channel quality database 212 may always be updated using the SINR value every time when the mobile terminal 102 reports. In this case, the value stored in the channel quality database 212 may be given a weight, and the stored value and the SINR value of the same locations (latitude and longitude) reported from the mobile terminal 102 are added and averaged. That is, the SINR value instantly detected by the mobile terminal 102 is not used as it is, thereby increasing the reliability of the SINR value.

The threshold values information 212*b* represented in FIG. 4B are SINR threshold values corresponding to the cumulative probability values at the area c. The SINR threshold values corresponding to each of the cumulative probability values of 0% to 100% are acquired in advance. These values are referenced when setting the SINR threshold value with respect to the cumulative probability values according to the communication service of the mobile terminal 102 using the communication service information reported from the mobile terminal 102.

Calculation Example of SINR Threshold Value

FIG. 5 is a graph illustrating the SINR threshold values calculated by a cumulative probability distribution. In the graph, the axis of abscissas indicates SINR values and the axis of ordinates indicates cumulative probability values. FIG. 5 corresponds to a graph on which the threshold value information 212*b* represented in FIG. 4B is charted.

The SINR threshold values are calculated from the channel quality information 212*a* represented in FIG. 4A using the cumulative probability distribution. Specifically, the threshold value determination unit 222 prepares a cumulative probability distribution for the channel quality information 212*a* at each of the areas a to p. In the preparation of the cumulative probability distribution, for example, all of the SINR values of an area (e.g., area c) intended to be prepared are extracted from the database of the channel quality information 212*a* in FIG. 4A and the SINR values are listed in an ascending order, such that the SINR values are determined with respect to the cumulative probability value. The prepared cumulative probability distribution becomes the SINR values according to the cumulative probability value as illustrated in FIG. 5.

The threshold value determination unit 222 sets a different SINR threshold value according to the communication service. As an example of the SINR threshold value, in a case where the communication service information indicates a real time service, the SINR value bbb[dB] corresponding to the cumulative probability value of 10% is set as the SINR threshold value. In the meantime, in a case where the communication service information indicates a non-real time service, the SINR value ddd[dB] corresponding to the cumulative probability value of 70% is set as the SINR threshold value.

Accordingly, in the real time service, since the SINR threshold value is set to a relatively low value, the time exceeding the SINR threshold value also increases so that the delay problem in a communication startup is resolved. Further, in the non-real time service, the SINR threshold value is set to a relatively high value. Accordingly, the starting of download is put on hold until the channel quality (SINR) reaches a good state such that the download is started efficiently (in a short time) when the channel quality becomes a good state.

For example, it is assumed that the SINR value reported by the mobile terminal 102 is c[dB]. In this case, if the communication service of the mobile terminal 102 is a real time service, download may be started. In contrast, if the communication service of the mobile terminal 102 is a non-real time service, the starting of download is put on hold.

In this manner, the starting of a communication is controlled according to the communication service such that it becomes possible to efficiently utilize the communication frequency and flexibly cope with the communication state (channel quality and communication service). Further, in a case where the communication service information is a real time service, it may be set in such a manner that the download may be allowed at any time without setting a SINR threshold value.

Exemplary Hardware Configuration of Communication Control Apparatus

Figure 6:
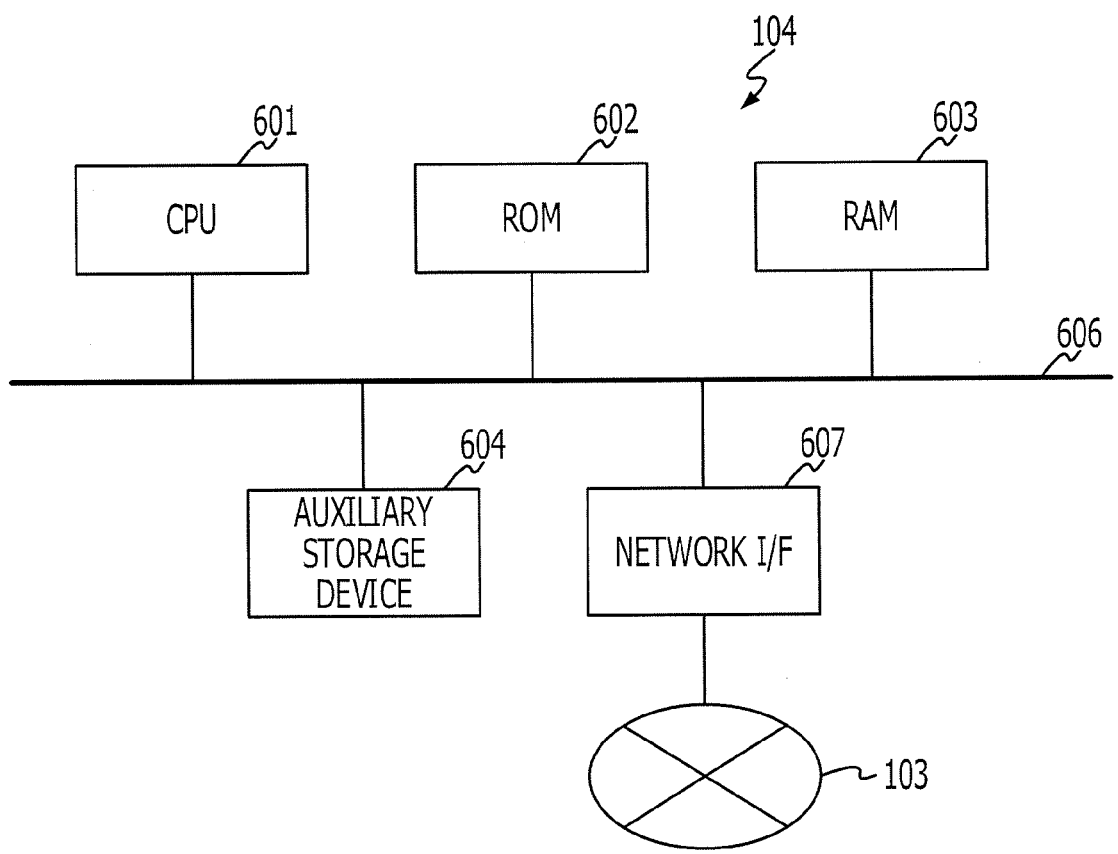
FIG. 6 is a block diagram illustrating an exemplary hardware configuration of the communication control apparatus.

FIG. 6 is a block diagram illustrating an exemplary hardware configuration of the communication control apparatus.

The communication control apparatus 104 includes a CPU 601, a ROM 602, a RAM 603, and an auxiliary storage device 604 such as, for example, a HDD. Further, the respective components are connected with each other via a bus 606.

Here, the CPU 601 is responsible for the control of the entire communication control apparatus 104. The ROM 602 stores programs such as, for example, a boot program. The RAM 603 is used as a working area of the CPU 601.

A network I/F 607 is connected to the network 103 (see, for example, FIG. 1), and connected to the base station 101 via the network 103. The network 103 in FIG. 6 is, for example, a network communication path such as S1 interface between the base station 101 and the communication control apparatus 104. In addition, it may be configured that an input/output interface (not illustrated) is installed to connect with an input device such as, for example, a keyboard or an output device such as, for example, a display.

The communication unit 201 represented in FIG. 2 may utilize the network I/F 607 represented in FIG. 6. The database unit 202 represented in FIG. 2 may utilize the auxiliary storage device 604 represented in FIG. 6. The control unit 203 represented in FIG. 2 may utilize the CPU 601, the ROM 602, and the RAM 603 as illustrated in FIG. 6. The ROM 602 stores programs for executing the respective functional units such as the location determination unit 221, the threshold value determination unit 222, and the communication determination unit 223 of the control unit 203 as illustrated in FIG. 2, and the CPU 601 executes these programs.

Communication Control Processes of Communication Control Apparatus

Figure 7:
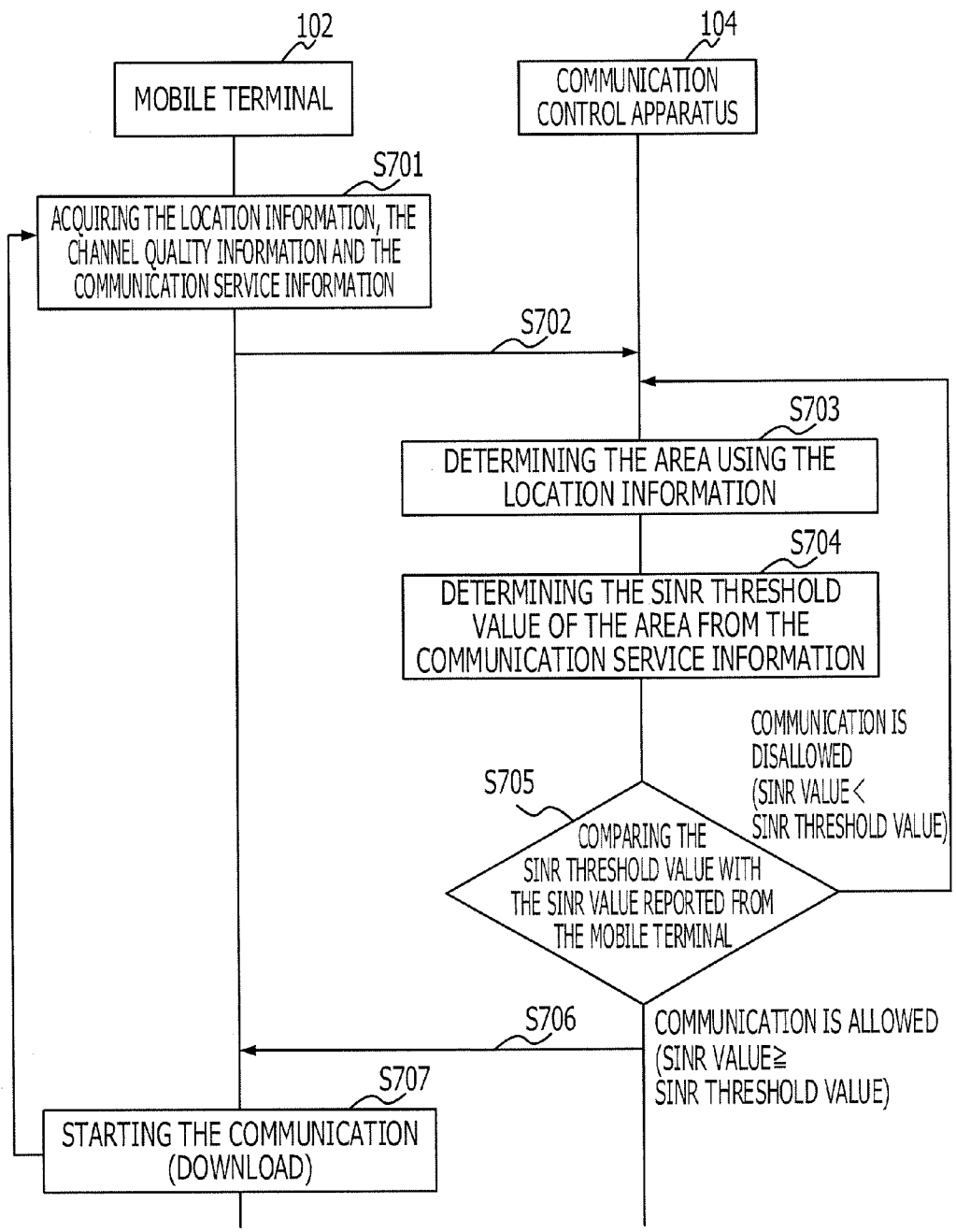
FIG. 7 is a sequence diagram illustrating the processing contents of a communication control processing performed by the communication control apparatus according to the first embodiment.

FIG. 7 is a sequence diagram illustrating the processing contents of the communication control performed by the communication control apparatus according to the first embodiment. In addition to the processing performed by the communication control apparatus 104, the processing performed by the mobile terminal 102 is described.

First, the mobile terminal 102 acquires the location information, the channel quality information and the communication service information (step S701), and reports the location information, the channel quality information and the communication service information to the communication control apparatus 104 via the base station 101 (step S702). The base station 101 transmits the location information, the channel quality information and the communication service information reported from the mobile terminal 102 to the communication control apparatus 104.

The communication control apparatus 104 determines an area where the mobile terminal 102 is located using the location information reported from the mobile terminal 102 (step S703). Specifically, the location determination unit 221 refers to the geographic information database 211 using the location information reported from the mobile terminal 102, determines where the mobile terminal 102 is located on a map, and determines an area where the mobile terminal 102 is currently located.

Subsequently, the communication control apparatus 104 determines the SINR threshold value of the area from the communication service information reported from the mobile terminal 102 (step S704). Specifically, the threshold value determination unit 222 acquires information regarding the area where the mobile terminal 102 is currently located from the location determination unit 221. Further, the threshold value determination unit 222 refers to the threshold value information 212*b* of the database unit 202 based on the communication service information reported from the mobile terminal 102 and determines the SINR threshold value corresponding to the communication service.

Subsequently, the communication control apparatus 104 compares the SINR value reported from the mobile terminal 102 with the SINR threshold value determined by the threshold value determination unit 222 (step S705). Specifically, the communication determination unit 223 compares the SINR threshold value determined by the threshold value determination unit 222 with the SINR value reported from the mobile terminal 102. Also, if the SINR value equals to or more than the SINR threshold value (step S705: communication is allowed), the communication control apparatus 104 instructs the mobile terminal 102 to start communication (step S706). Accordingly, the mobile terminal 102 starts to download from the base station 101 (step S707).

In the meantime, if the SINR value is less than the SINR threshold value (step S705: communication is disallowed), the communication control apparatus 104 does not instruct the mobile terminal 102 to start communication, and the processing returns to step S703 and the operations after step S703 are repeated again. In this case, the download from the base station 101 by the mobile terminal 102 is put on hold until the SINR value becomes the SINR threshold value or more.

After the mobile terminal 102 starts a download processing at step S707, the processing returns to step S701. Accordingly, the processing described above are continued during the period between download start and download end, and the channel quality and the threshold value are always compared with each other to determine whether the download is to be continued or temporarily stopped.

With the communication control described above, it becomes possible to control the starting of data transmission (download) from the base station 101 to the mobile terminal 102 in response to the variation of the channel quality in each area. Moreover, the threshold value of the channel quality is changed depending on the realtimeness (the real time nature) of the communication service in the mobile terminal 102 such that the starting of the download is controlled according to the realtimeness (a real time nature) of each communication service. Accordingly, an instant download may be started for the mobile terminal 102 being serviced with the communication service which requires an instant download. Further, the download may be put on hold for the mobile terminal 102 being serviced with the communication service which does not require an instant download thereby making a wireless resources occupation time to be different.

Accordingly, the wireless resources between the base station 101 and the mobile terminal 102 may be utilized efficiently such that the delay in wireless communication between the base station 101 and the mobile terminal 102 can be prevented from being increased and the frequency utilization efficiency also can be enhanced. Conventionally, the threshold value is set to be constant regardless of the communication service type, so that the download has not been started when the channel quality equals to or less than the threshold value and the delay time increases. In contrast, according to the communication control described above, when the communication service type is a real time service, the download can be started while suppressing the delay as much as possible. Further, when the communication service type is a non-real time service, the download is performed at a timing when the channel quality is good, so that the frequency of wireless resources can be efficiently (less occupation time) utilized at the period when the channel quality is good.

Regarding Frequency Utilization Efficiency

Figure 8:
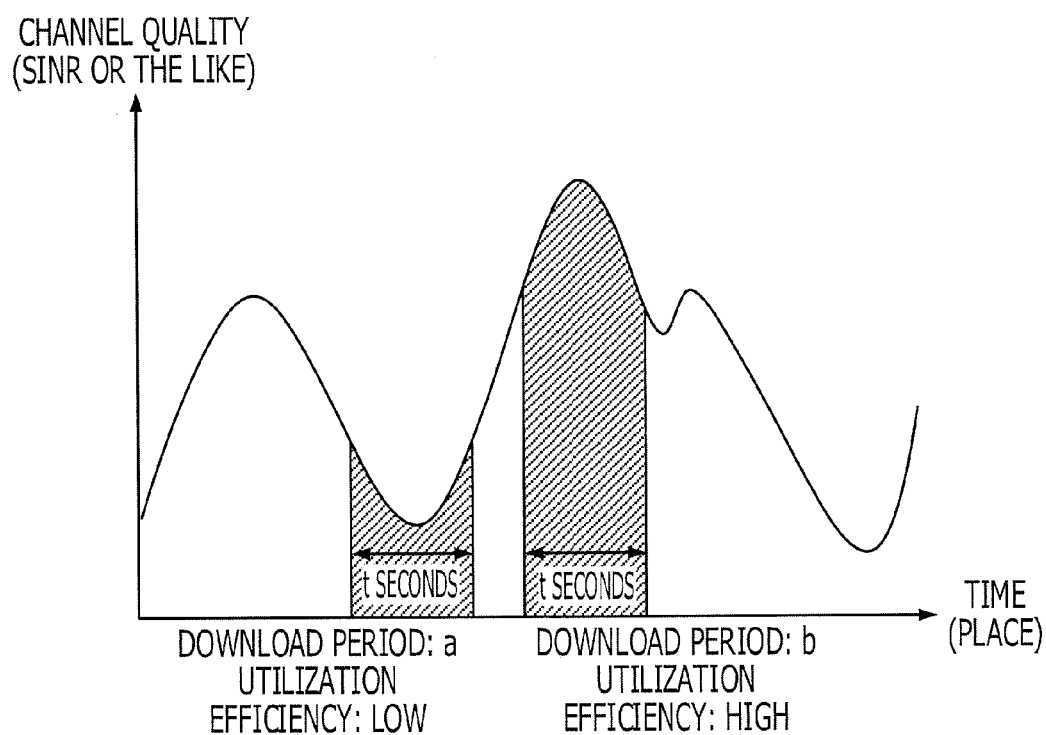
FIG. 8 is a view for explaining an effect of an improvement of frequency utilization efficiency according to the first embodiment.

FIG. 8 is a view for explaining the effect of improving the frequency utilization efficiency according to the first embodiment. The axis of ordinates represents the channel quality such as the SINR and the axis of abscissas represents times (and places). The axis of abscissas indicates the moving state of the mobile terminal 102, and is represented by times (and places) in order to represent the channel quality at a specific place as the mobile terminal 102 is located at different places at different times.

In FIG. 8, it is assumed that there are two download periods a and b, and the mobile terminal 102 performs a download for t seconds in each of the periods a and b. When comparing the downloaded amount between the download periods a and b, the channel quality during the download period b is better than that of the download period a. In this case, the downloaded amount (the area depicted by inclined lines in FIG. 8) during the download period b becomes larger than that of the download period a. As a result, the frequency utilization efficiency may be enhanced from the result that the download amount for the same t seconds is increased when the download is started at a time when the channel quality becomes in a better state.

Second Embodiment

Another Example of Acquiring Channel Quality of Mobile Terminal

In the first embodiment, the communication control apparatus 104 determines the SINR threshold value using the channel quality (e.g., SINR value) reported from the mobile terminal 102 and determines whether communication is to be allowed or disallowed. Alternatively, without being limited to this, the mobile terminal 102 may be configured to report information regarding the location and the communication service only, and not to report the channel quality (e.g., SINR value). In this case, the location determination unit 221 of the communication control apparatus 104 retrieves the SINR value at the reported location of the mobile terminal 102 or at a location close to the reported location in the channel quality database 212, and sets the retrieved result as the SINR value. Also, the threshold value determination unit 222 determines the SINR threshold value using the retrieved SINR value in order to determine whether a communication is to be allowed or disallowed. The configuration of the communication control apparatus 104 in the second embodiment is substantially similar to that in FIG. 2, but the processing for determining the location of the mobile terminal 102 in the location determination unit 221 is different from that in the first embodiment.

Figure 9:
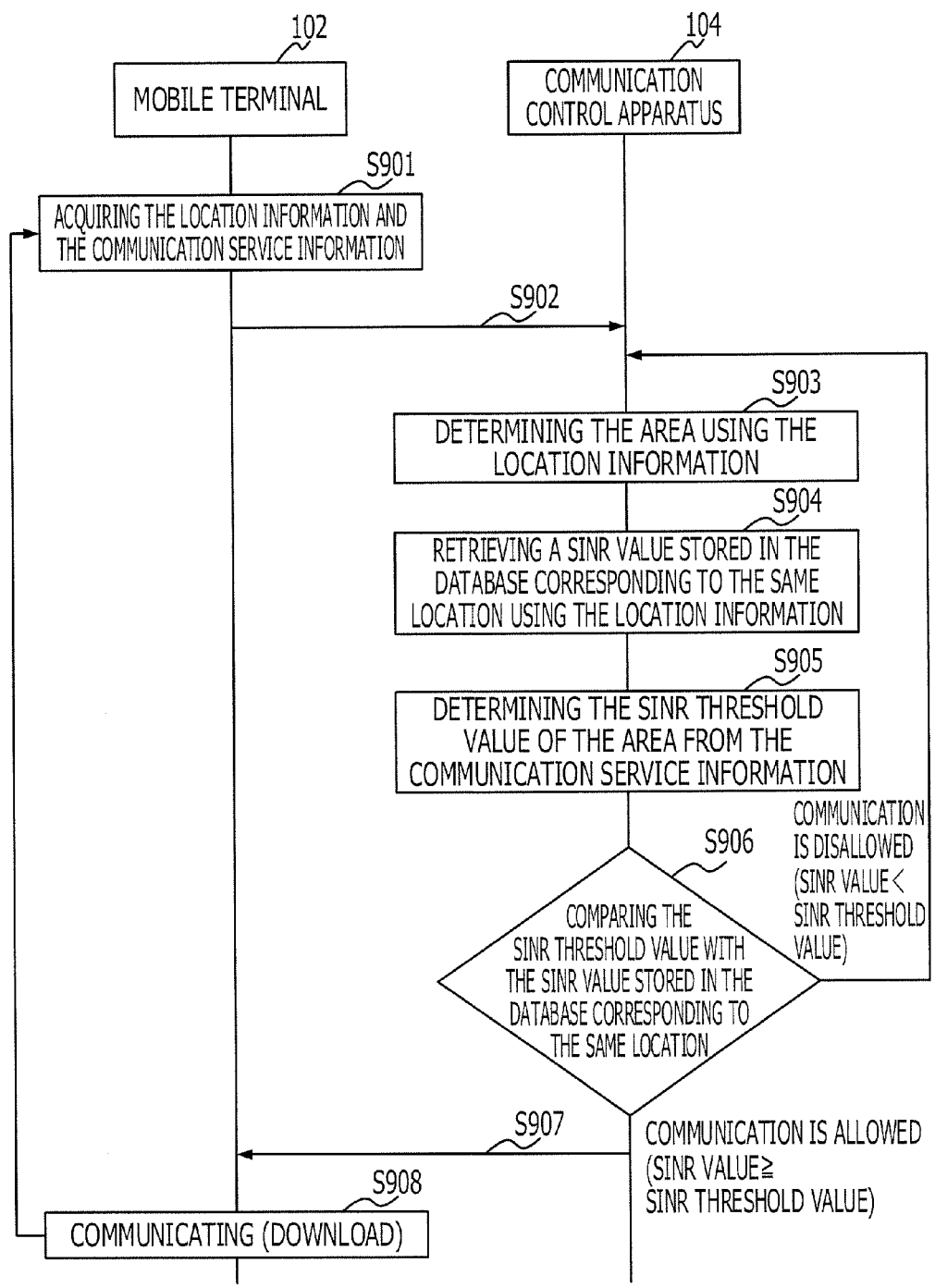
FIG. 9 is a sequence diagram illustrating the processing contents of a communication control processing performed by the communication control apparatus according to a second embodiment.

FIG. 9 is a sequence diagram illustrating the processing contents of a communication control performed by the communication control apparatus according to a second embodiment. First, the mobile terminal 102 acquires the location information, the channel quality information and the communication service information (step S901), and reports the location information, the channel quality information and the communication service information to the communication control apparatus 104 via the base station 101 (step S902). The base station 101 transmits the location information, the channel quality information and the communication service information reported from the mobile terminal 102 to the communication control apparatus 104.

The communication control apparatus 104 determines an area where the mobile terminal 102 is located using the location information reported from the mobile terminal 102 (step S903). Specifically, the location determination unit 221 refers to the geographic information database 211 using the location information reported from the mobile terminal 102, determines where the mobile terminal 102 is located on a map, and determines an area where the mobile terminal 102 is currently located.

Subsequently, using the location information reported from the mobile terminal 102, the communication control apparatus 104 retrieves a SINR value stored in the channel quality database 212 corresponding to the same location as the mobile terminal 102 (step S904). Alternatively, without being limited to this, the communication control apparatus 104 may be configured to retrieve the SINR value at a location close to the location reported from the mobile terminal 102, and determine a SINR threshold value of an area from the communication service information using the retrieved SINR value (step S905). Specifically, the threshold value determination unit 222 acquires the area information where the mobile terminal 102 is currently located from the location determination unit 221. Moreover, the threshold value determination unit 222 refers to the threshold value information 212*b* of the database unit 202 based on the communication service information reported from the mobile terminal 102 in order to determine the SINR threshold value which corresponds to the communication service.

Subsequently, the communication control apparatus 104 compares the SINR value corresponding to a location reported from the mobile terminal 102 with the SINR threshold value determined by the threshold value determination unit 222 (step S906). Specifically, the communication determination unit 223 compares the SINR value of the location reported from the mobile terminal 102 acquired by retrieving the channel quality database 212 with the SINR threshold value determined by the threshold value determination unit 222. Also, if the SINR value equals to or larger than the SINR threshold value (step S906: communication is allowed), the communication control apparatus 104 instructs the mobile terminal 102 to start communication (step S907). Accordingly, the mobile terminal 102 starts download from the base station 101 (step S908).

In the meantime, if the SINR value is less than the SINR threshold value (step S906: communication is disallowed), the communication control apparatus 104 does not instruct the mobile terminal 102 to start communication, and the processing is returned to step S903, and the operations after step S903 are repeated again. In this case, the download from the base station 101 by the mobile terminal 102 is put on hold until the SINR value becomes larger than or equal to the SINR threshold value.

After the mobile terminal 102 starts download at step S908, the processing returns to step S901. Accordingly, the processing described above continues during the period between download start and download end, and the channel quality and the threshold value are always compared with each other to determine whether download is to be continued or temporarily stopped.

As described above, the similar effects as in the first embodiment can be acquired in the second embodiment. According to the second embodiment, the reporting of the channel quality (SINR value) from the mobile terminal 102 may be unnecessary, and also the function of measuring the channel quality in the mobile terminal 102 may be omitted. Further, the transmission of the channel quality information from the mobile terminal 102 to the communication control apparatus 104 may be omitted, thereby reducing the amount of data.

Third Embodiment

Example of Providing an Upper Limit to Threshold Value

The configuration of the communication control apparatus 104 in the third embodiment is substantially similar to that in FIG. 2, but the processing of location determination of the threshold value in the threshold value determination unit 222 is different from that in the second embodiment. In the third embodiment, an upper limit value (or a ceiling value) of SINR is provided in the threshold value determination unit 222 for re-setting the SINR threshold value. Also, when the SINR threshold value is higher than the upper limit value of SINR, the upper limit value of SINR is re-set as the SINR threshold value.

Figure 10A:
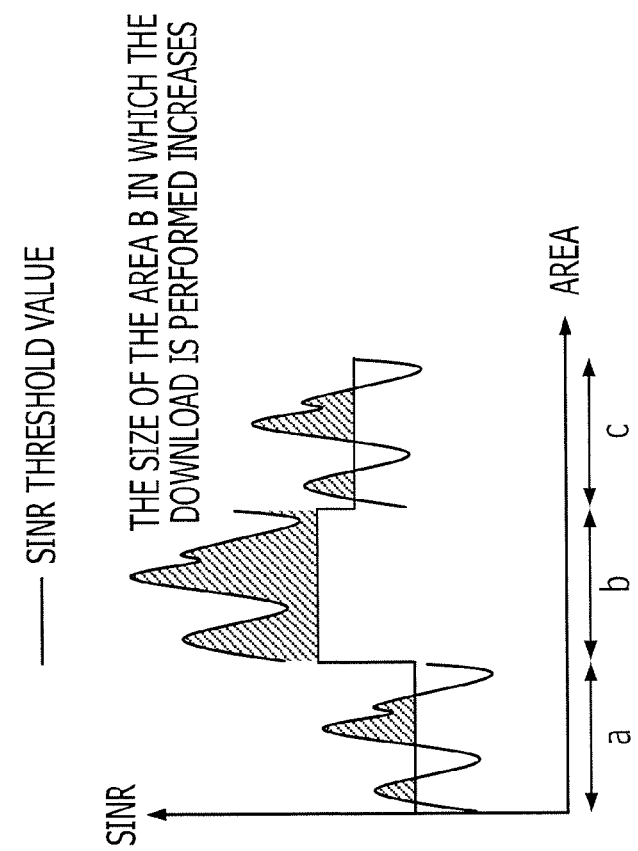
FIGS. 10A and 10B are views explaining a re-set state of a threshold value according to a third embodiment.
Figure 10B:
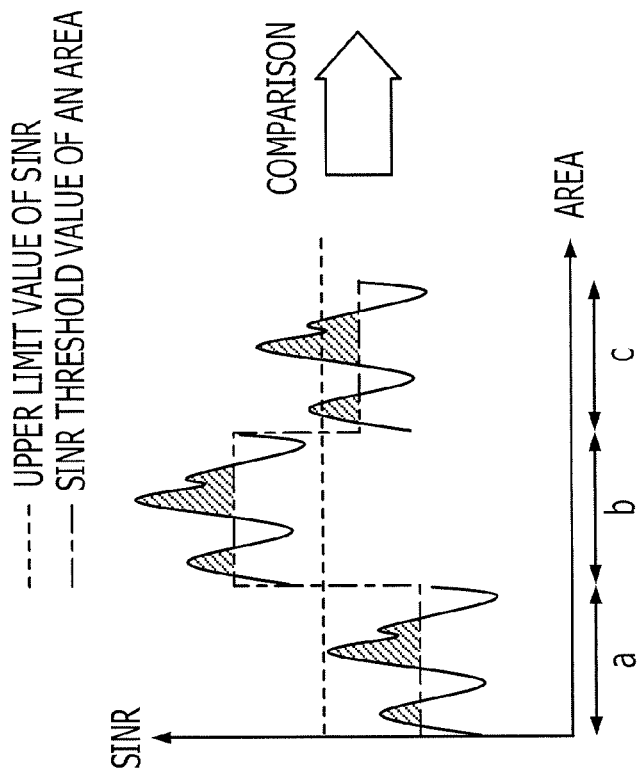

FIG. 10 is a view explaining a re-set state of the threshold value according to the third embodiment. In FIG. 10, the axis of abscissas indicates the areas and the axis of ordinates indicates the SINR, and three areas a, b, and c are depicted. In FIG. 10A, the SINR threshold value and the upper limit value of SINR for each of areas a, b and c are depicted. For the areas a and c, the SINR threshold values are lower than the upper limit value of the SINR and thus, the SINR threshold values are used as they are, as illustrated in FIG. 10B.

In the meantime, for the area b illustrated in FIG. 10A, the SINR threshold value has exceeded the upper limit value of the SINR. In this case, the threshold value determination unit 222 sets the SINR threshold value of the area b as the upper limit value of the SINR as illustrated in FIG. 10B. In this case, the SINR threshold value of the area b is made to be lowered to the upper limit value of the SINR. As described above, a similar download control is performed to the first embodiment using the re-set SINR threshold value.

Accordingly, as compared to the time before the SINR threshold value is changed in the area b, the downloaded amount (an area depicted by inclined lines in FIG. 10) may be made larger along with the increasing of the size of the area b in which the download is performed, at the time after the SINR threshold value has been changed.

The determination method of the upper limit value of the SINR may specify a single upper limit value for the entire country regardless of the areas. In addition, districts, metropolis or administrative districts (e.g., prefectures in Japan), or the earth may be assumed as a big area and a certain percentage value of the cumulative probability distribution in a database for that area may be set as the upper limit value of the SINR. For example, an area with many mountains and an area of the level ground are defined as separate areas such that a predetermined upper limit value of the SINR is set for each of the areas, based on the fact that the channel quality (SINR) is different depending on, for example, a topography. Similarly, an urban area with many buildings and a suburban area are defined as separate areas, such that a predetermined upper limit value of the SINR is set for each of the areas.

FIG. 11 is a sequence diagram illustrating the processing contents of the communication control performed by the communication control apparatus according to the third embodiment. First, the mobile terminal 102 acquires location information, channel quality information and communication service information (step S1101), and reports the location information, the channel quality information and the communication service information to the communication control apparatus 104 via the base station 101 (step S1102). The base station 101 transmits the location information, the channel quality information and the communication service information reported from the mobile terminal 102 to the communication control apparatus 104.

The communication control apparatus 104 determines an area where the mobile terminal 102 is located using the location information reported from the mobile terminal 102 (step S1103). Specifically, the location determination unit 221 refers to the geographic information database 211 using the location information reported from the mobile terminal 102, determines where the mobile terminal 102 is located on a map, and determines an area where the mobile terminal 102 is currently located.

Subsequently, the communication control apparatus 104 determines a SINR threshold value of the area from the communication service information reported from the mobile terminal 102 (step S1104). Specifically, the threshold value determination unit 222 acquires the area information regarding where the mobile terminal 102 is currently located from the location determination unit 221. Further, the threshold value determination unit 222 refers to the threshold value information 212b of the database unit 202 based on the communication service information reported from the mobile terminal 102, and determines a SINR threshold value corresponding to the communication service.

Subsequently, the threshold value determination unit 222 of the communication control apparatus 104 compares the SINR threshold value set for the area with a preset upper limit value of SINR, and if necessary, re-sets the SINR threshold value (step S1105). Specifically, if the SINR threshold value equals to or less than the upper limit value of SINR, the threshold value determination unit 222 uses the SINR threshold value as it is. In the meantime, if the SINR threshold value is larger than the upper limit value of the SINR, the threshold value determination unit 222 re-sets the upper limit value of SINR as a SINR threshold value.

Thereafter, the communication control apparatus 104 compares the SINR value reported from the mobile terminal 102 with the SINR threshold value determined by the threshold value determination unit 222 (step S1106). Specifically, the communication determination unit 223 compares the SINR threshold value determined by the threshold value determination unit 222 with the SINR value reported from the mobile terminal 102. Also, if the SINR value equals to or larger than the SINR threshold value (step S1106: communication is allowed), the communication control apparatus 104 instructs the mobile terminal 102 to start communication (step S1107). Accordingly, the mobile terminal 102 starts the download from the base station 101 (step S1108).

In the meantime, if the SINR value is less than the SINR threshold value (step S1106: communication is disallowed), the communication control apparatus 104 does not instruct the mobile terminal 102 to start communication, and the processing returns to step S703, and the operations after step S1103 are repeated again. In this case, the download from the base station 101 by the mobile terminal 102 is put on hold until the SINR value becomes larger than or equal to the SINR threshold value.

After the mobile terminal 1108 starts the download at step S707, the processing returns to step S1101. Accordingly, the processing described above continues during the period between the download start and the download end, and the channel quality and the threshold value are always compared with each other in order to determine whether the download is to be continued or temporarily stopped.

According to the third embodiment described above, substantially similar effects to the first embodiment may be obtained. In addition, since an upper limit for the SINR threshold value is set to re-set the SINR threshold value for each area, an appropriate value may be set as the SINR threshold value, thereby enhancing the frequency utilization efficiency.

Other Example of Area Division

In a method of dividing a map into multiple areas as described above, the map is divided into a checkerboard (matrix) type areas arranged at regular intervals along the east, the west, the north, and the south (latitude and longitude) directions in the example illustrated in FIG. 3. Alternatively, without being limited to dividing the map on the basis of the direction, a map may be divided into multiple areas according to the channel quality. For example, the size and shape of the area may be made to vary according to the channel quality (SINR value) or information obtained from the mobile terminal 102. Another method of dividing the map into multiple areas corresponding to the channel quality may regard neighboring places having approximately the same SINR values stored in the channel quality database 212 as an area, and the map may be divided into these areas.

Further, in another method of dividing the map into multiple areas, the map may be divided into the areas that follow a movement direction of the mobile terminal 102 when the moving state can be presupposed. For example, the method may be applied when the mobile terminal 102 moves along a fixed traffic route such as a train or a bus. On the map, it may be understood beforehand that the movement path of the mobile terminal 102 of a user who is in the train follows the track of the train. In this case, the map is divided into multiple areas along the track. For example, neighboring areas are aggregated with reference to the direction of the track. Accordingly, the mobile terminal 102 of the user moves between the presupposed neighboring areas following the movement of the train.

The shape of each area may have an angle with respect to the latitude and longitude directions without following the latitude and longitude (east, west, south, north) directions. The size of each area may be lengthened along the track or curve points may be transformed. Further, within the areas of the divided map, an area itself where the mobile terminal 102 cannot enter may not be set for a zone, and the determination process of whether communication is allowed or disallowed may not be performed for the unnecessary area.

Accordingly, the communication control apparatus 104 may prevent a frequent area change as the mobile terminal 102 sequentially moves between the predetermined areas, even without analyzing the movement pattern of the mobile terminal 102. Also, since the mobile terminal 102 remains at an area for a predetermined time before passing through the area, the processing load may be reduced according to the communication control in the communication control apparatus 104, and a stable communication control (download control) may be performed at a high precision. The method of dividing the map may not be limited to the train track but may also be applied similarly to a bus route since the bus route is predefined as well.

Further, in another method of dividing the map into multiple areas, the map may be divided into areas according to a download size (transmission data size requested to the base station 101) received by the mobile terminal 102 from the base station 101. The area size may be changed in response to the download size of the mobile terminal 102, such that the download control may be performed at a higher precision. An area size change unit (not illustrated) may be provided inside or outside of the location determination unit 221 to change the size of the area. Upon receipt of a report regarding the download size from the mobile terminal 102, the area size change unit may change the size of the area of the geographic information database 211 in response to the download size.

Figure 12B:
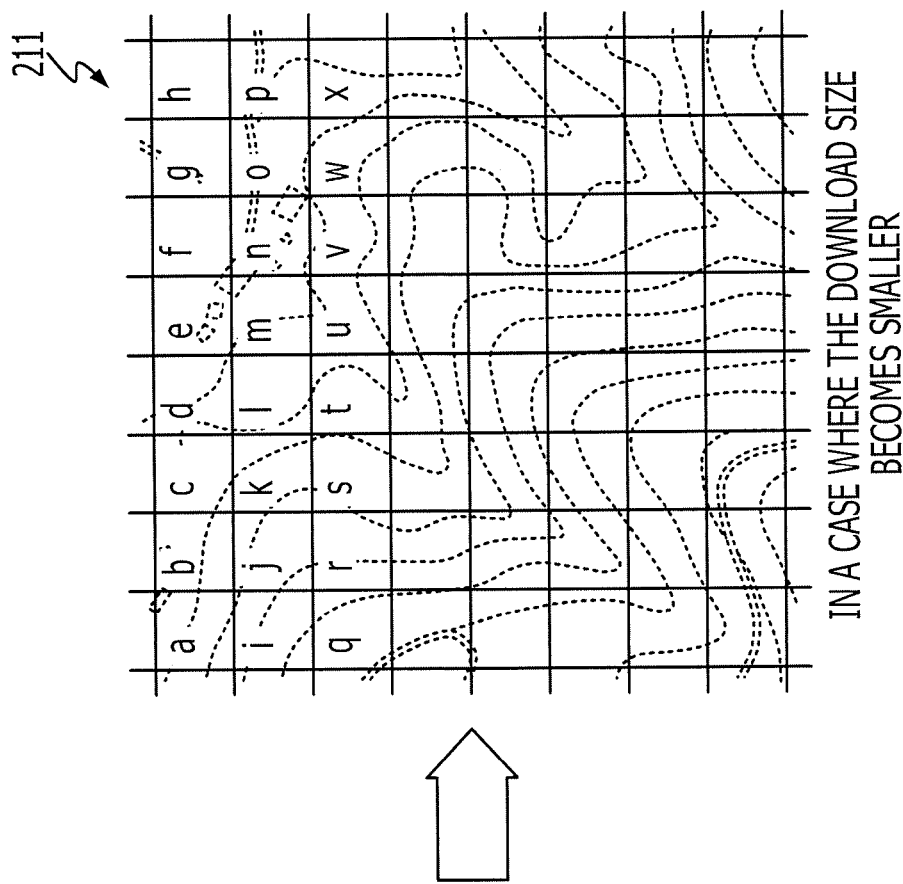
FIGS. 12A and 12B are views illustrating another example of an area division.
Figure 12A:
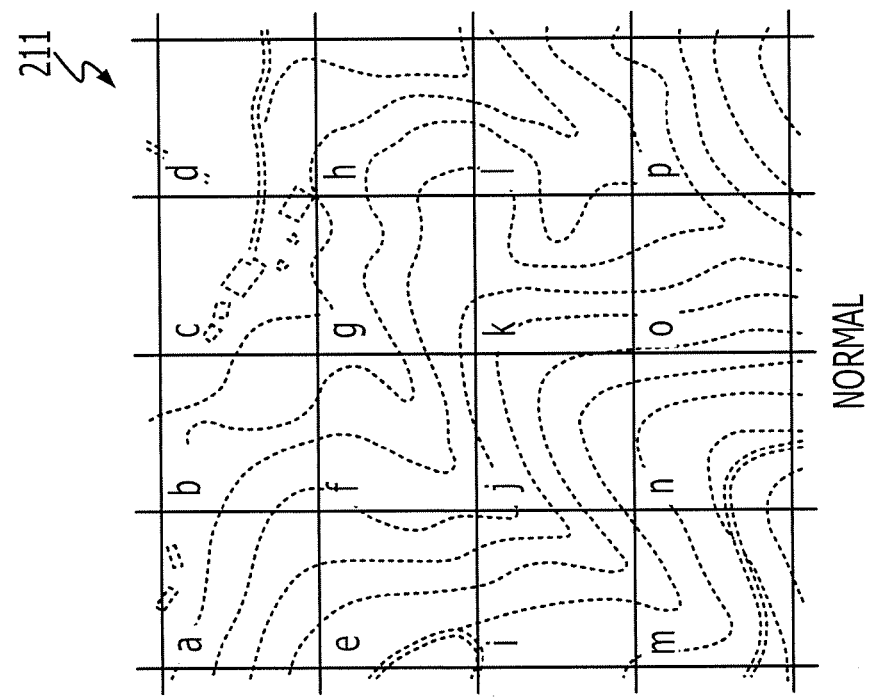

FIG. 12 is a view illustrating another example of the method of dividing the map into multiple areas. FIG. 12A is substantially similar to FIG. 3. It is assumed that the size of an area used for dividing the map is initially set as the size of area represented in FIG. 12A. After the initial setting of the size, it is assumed that the area size is changed when the download size of the mobile terminal 102 becomes smaller. In this case, the time needed for the download is also reduced correspondingly. For this reason, the area size change unit of the communication control apparatus 104 changes the size of the area to allow the map to be more finely divided as illustrated in FIG. 12B. As a result, the number of the areas on the map increases after the size of the area is changed, and also the number of the SINR threshold values increases as well by the number of the areas.

Further, the SINR threshold value corresponding to the area after being changed may be obtained using each SINR value of the plurality of locations within one area in response to the change of the area. Accordingly, the determination process whether a communication is allowed or disallowed may be performed during the download for each of the finely divided areas, and the download control may be performed at a higher precision.

According to each embodiment described above, the frequency utilization efficiency of wireless channels (wireless resources) may be improved even without predicting the movement path of the mobile terminal or the variation of the SINR value. In particular, since different threshold values are set for each of the various communication services type, it is possible to perform a flexible download control appropriate for the real time nature requested by the communication service. An instant data transmission is ensured for the communication that requires a real time nature to meet the requirement. In the meantime, for a communication type with a non-real time nature, a communication start may be put on hold until the channel quality is improved to a good state, and the download amount increases by communicating in a good state, thereby enhancing the communication efficiency. Further, the change of channel quality such as the change to a good state in channel quality, as described above, occurs from either one of the cases where there is an elapse of time in the same area or where the mobile terminal moves to other areas.

Accordingly, the wireless resources are efficiently utilized and, as a result, the frequency utilization efficiency is enhanced. Further, since the mobile terminal may be able to receive download data for a short time in a good state in channel quality, the power consumption required for the download may be reduced and the life of the power supply (battery) of the mobile terminal may be lengthened as well.

Further, in each embodiment described above, the type of communication service is divided into two of a real time service and a non-real time service. However, the type of communication service may be more finely divided into, for example, three or more types, and the determination regarding whether the communication is allowed or disallowed may be performed using the number of threshold value corresponding to the number of finely divided areas. Accordingly, the start timing of download may be controlled finely depending on the type of communication service.

Further, the communication control method explained in the present embodiment may be implemented by executing a program provided in advance with a personal computer or a workstation. Further, the program is recorded on a computer readable recording medium such as, for example, a hard disc, a flexible disc, a CD-ROM, a MO, a DVD, and the program may be executed through the read-out from the recording medium by the computer. Further, the program may be distributed through a network such as the Internet.

According to one aspect, it is possible to perform a communication control according to the channel quality of a mobile terminal, thereby enhancing the communication efficiency.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A communication control apparatus that controls a wireless communication between a base station and a terminal, the communication control apparatus comprising:
   a memory configured to store combinations of threshold values of channel qualities, a plurality of areas, and required realtimenesses each being information indicative of a required length of a delay time from receiving a request for a data communication from the terminal to performing the data communication; and
   a processor configured to:
   obtain information on a specified area and a specified required realtimeness, the specified area being an area of the plurality of areas in which the terminal is located, the specified required realtimeness being a required realtimeness for the terminal,
   obtain a specified threshold value of a channel quality corresponding to the specified area and the specified required realtimeness, based on the combinations of the threshold values stored in the memory, and
   allow the terminal the data communication, when a channel quality between the terminal and the base station is determined to be better than the specified threshold value of the channel quality,
   wherein, for each of the plurality of areas, each of the threshold values of channel qualities is lower when a corresponding required realtimeness of required realtimenesses indicates a shorter required length of a delay time.

2. The communication control apparatus according to the claim 1, wherein the channel quality is reported by the terminal.

3. The communication control apparatus according to the claim 1, wherein each of the threshold values is determined in accordance with a plurality of channel qualities in one of the plurality of areas which is combined to produce each of the threshold values.

4. The communication control apparatus according to the claim 1, wherein each of the threshold values is determined in accordance with cumulative probability of a plurality of channel qualities in one of the plurality of areas which is combined to produce each of the threshold values, for each of the realtimenesses.

5. The communication control apparatus according to the claim 1, wherein a first threshold value is smaller than a second threshold value, the first threshold value is combined with a first realtimeness of the realtimenesses which is relatively higher in degree, and the second threshold value is combined with a second realtimeness of the realtimenesses which is relatively lower in degree.

6. The communication control apparatus according to the claim 1, wherein the specified threshold value is truncated to a ceiling value.

7. The communication control apparatus according to the claim 1, wherein the processor is further configured to change an area size of each of the plurality of areas in accordance with a data size of the data communication.

8. The communication control apparatus according to the claim 1, wherein the areas, when a moving direction of the terminal is estimated, are set as to be in the moving direction.

9. The communication control apparatus according to the claim 8, wherein the areas are set as to be in the moving direction which is estimated by traffic routes.

10. The communication control apparatus according to the claim 1, wherein the channel quality comprises signal to interference plus noise ratio.

11. The communication control apparatus according claim 1, wherein the realtimeness indicates a real-time nature of the data communication for a real-time service.

12. A communication control system comprising:
   a base station;
   a terminal configured to perform a wireless communicates with the base station;
   a communication control apparatus including a memory configured to store combinations of threshold values of channel qualities, a plurality of areas, and required realtimenesses each being information indicative of a required length of a delay time from receiving a request for a data communication from the terminal to performing the data communication; and
   a processor configured to:
   obtain information on a specified area and a specified required realtimeness, the specified area being an area of the plurality of areas in which the terminal is located, the specified required realtimeness being a required realtimeness for the terminal,
   obtain a specified threshold value of a channel quality corresponding to the specified area and the specified required realtimeness, based on the combinations of the threshold values stored in the memory, and
   allow the terminal the data communication, when a channel quality between the terminal and the base station is determined to be better than the specified threshold value of the channel quality,
   wherein, for each of the plurality of areas, each of the threshold values of channel qualities is lower when a corresponding required realtimeness of required realtimenesses indicate a shorter required length of a delay time.

13. The communication control system according to the claim 12, wherein the channel quality is reported by the terminal.

14. The communication control system according to the claim 12, wherein the terminal reports location information of the terminal, and the processor is further configured to specify the specified area in accordance with the location information.

15. A communication control method that controls a wireless, communication between a base station and a terminal, the communication control method comprising:
   storing combinations of threshold values of channel qualities, a plurality of areas, and required realtimenesses each being information indicative of a required length of a delay time from receiving a request for a data communication from the terminal to performing the data communication;

obtaining information on a specified area and a specified required realtimeness, the specified area being an area of the plurality of areas in which the terminal is located, the specified required realtimeness being a required realtimeness for the terminal;

obtaining a specified threshold value of a channel quality corresponding to the specified area and the specified required realtimeness, based on the combination of the threshold values stored in the memory, and allowing the terminal the data communication, when a channel quality between the terminal and the base station is determined to be better than the specified threshold value, wherein, for each of the plurality of areas, each of the threshold values of channel qualities is lower when a corresponding required realtimeness of required realtimenesses indicates a shorter required length of a delay time.

* * * * *